United States Patent

Fullam

[15] 3,643,522
[45] Feb. 22, 1972

[54] LOW FRICTION BEARING LINER FABRICATION

[72] Inventor: John Peter Fullam, Baie D'Urfee, Montreal, Quebec, Canada

[73] Assignee: Abex Industries of Canada, Ltd., St. Laurent, Montreal, Canada

[22] Filed: Aug. 31, 1970

[21] Appl. No.: 68,116

[52] U.S. Cl. .............................74/424.8 A, 74/459, 74/467
[51] Int. Cl. ...................F16h 1/18, F16h 55/22, F16h 57/04
[58] Field of Search..............................74/459, 467, 424.8 A

[56] References Cited

UNITED STATES PATENTS 2,441,580   5/1948   Mageoch.........................74/459 UX
3,081,644   3/1963   Hudgens et al. ....................74/459 X Primary Examiner—Leonard H. Gerin
Attorney—Frank H. Foster and Jerome R. Cox

[57] ABSTRACT

A low friction nut liner for lining the interior of the nut member of a jackscrew type actuating mechanism. The nut liner is cut longitudinally into three arcuate segments, one segment being cut along two parallel planes. The three segments are bonded at the interior of the nut member with an epoxy adhesive which contains aluminum particles for improved heat transfer from the liner to the nut member. The liner is mounted in the nut member by inserting each segment, in turn, axially into the nut member and then moving it radially outwardly against the inner wall of the nut member. The segment having parallel cuts is inserted last by similarly moving it axially into the nut member and then moving it parallel to its cuts into the remaining gap.

16 Claims, 8 Drawing Figures

PATENTED FEB 22 1972 3,643,522

INVENTOR.
JOHN P. FULLAM
BY Frank H. Foster
ATTORNEY

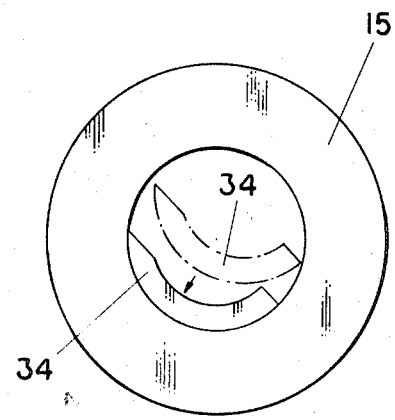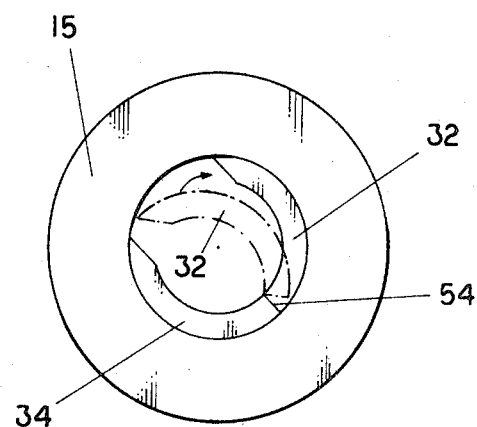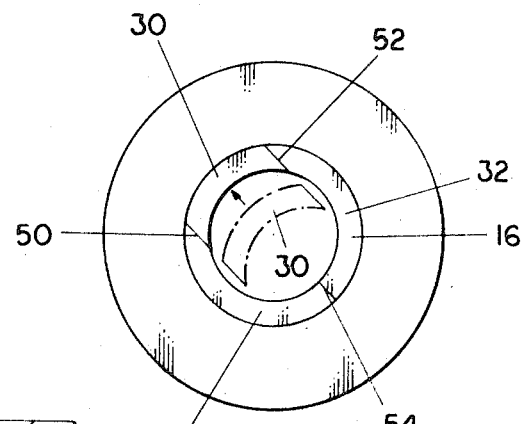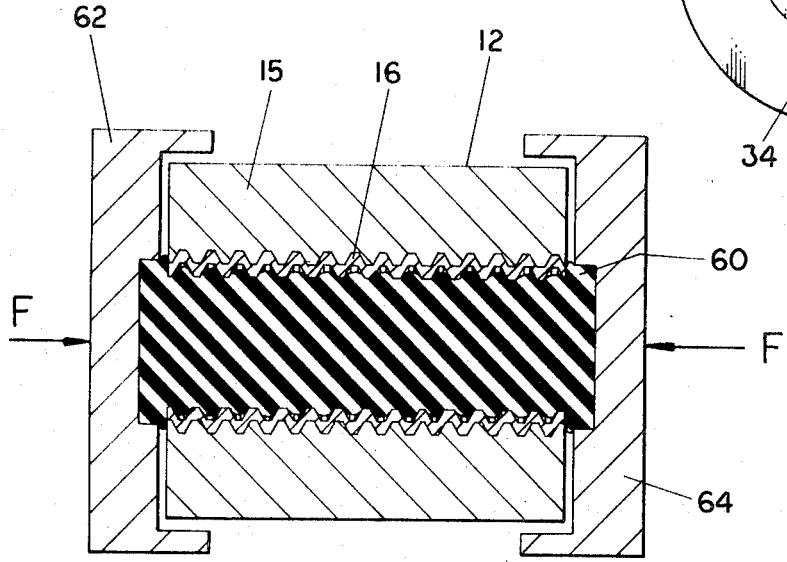

LOW FRICTION BEARING LINER FABRICATION

BACKGROUND OF THE INVENTION

This invention relates to low friction bearing liners, and more particularly relates to nut liners for nut and jackscrew combinations such as used for example, in actuators wherein the screw is axially driven. Such actuators have been used to elevate ballistic missiles, raise airplane canopies, sight heavy guns, control aircraft wing flaps and elevator turnpads, and to vary the sweep of the wings of an airplane.

Actuators used in the above applications, and especially those used to vary the sweep of aircraft wings, bear extremely high axial loads. Such high axial loads result in excessive friction between the mating threads of the screw and the nut members. One conventional solution to this friction problem is the ball screw actuator in which ball bearings are disposed between the threads of the screw and the threads of the nut. While this arrangement provides low friction and long wear, it has the added disadvantage of being expensive and relatively heavy in weight.

Another prior art solution consists of providing a bronze coating on the thread surfaces. While this reduces the cost and weight, the bronze coating has the disadvantage of requiring frequent lubrication. It is subject, therefore, to rapid wear with excessive backlash soon developing as a result of the wear. The backlash itself then produces further wear.

The third solution offered by the prior art is the molded, lubricant-impregnated, fabric liner or molded, resin liner such as shown in the U.S. Pat. Nos. to Runton et al., 2,953,418, to Cheesman et al., 3,483,056, and to Chesnut et al., 3,002,770. Such liners have improved the friction, weight, and cost factors in the jackscrew actuators. However, they have introduced problems in bonding the liners to the interior surface of the nut members.

In conventional bonding, the exterior of the liner is threaded and coated with the bonding agent. The interior of the nut member is similarly threaded and coated. The liner is then rotated and screwed into the nut member. However, this causes the bonding agent to be wiped away from the cooperating threads leaving little or no bonding agent to actually bond the liner to the nut member after the liner is fully threaded into the nut member. An alternative was offered in the Cheesman patent, cited above, which involved expanding an undersized liner with a mandrel into the interior threads of the nut member. This, however, while partially solving the problem of loss of bonding agent, results in the physical stress and distortion of the liner and in incomplete conforming of the exterior of the liner to the interior of the nut member. Furthermore, in general, rigid materials have characteristics which are superior to those of deformable materials for use in liners. For example, liners built up from successive layers of a continuous medium, such as the textile layers shown in the Runton and the Cheesman patents, are more likely to suffer laminar separation. This laminar separation causes reduced heat conductivity, increases bearing friction and dimensional changes.

A further problem is that fabric and resin low friction liners, and similarly the bonding agents used to secure them to the nut members, are poor heat conductors. Yet in the nut and jackscrew actuators bearing heavy loads, dissipation of heat which is produced by friction becomes important.

The problems of inserting a threaded liner in a mating threaded outer member are similar to those where the liner and the outer member are unthreaded. For example, the liner and outer member may have smooth, cylindrical, mating inner and outer surfaces. Axial sliding of such an unthreaded bearing liner into its outer member would similarly remove bonding agent. Heat transfer would still be important. Therefore, this invention applies not only to bearing liners in which a shaft is threadedly engaged to the liner, but also other types of bearing liner and shaft engagement such as, for example, that of a rotating shaft journaled in its bearing.

It is therefore an object and purpose of the invention disclosed herein to overcome the described disadvantages. The liner of the invention can be inserted in the nut member without physical distortion of the liner and yet without removal of the bonding agent from between the adhering surfaces. Furthermore, heat transfer is improved by the adhesive provided by this invention.

A further object and feature of the invention is to provide a liner which after periods of use can be removed and replaced by a new liner.

A further object and feature of the invention is to provide a low friction liner which, although removable and replaceable, has no significant discontinuities along its threaded interior surface.

A still further object and feature of the invention is to provide a liner exhibiting an advantageous combination of such characteristics as low friction, long wear, adequate heat transfer, light weight, low cost, and ease of assembly.

Further objects, features, and advantages of the invention will be apparent from the following specification and claims when considered in connection with the accompanying drawings illustrating several embodiments of the invention.

SUMMARY OF THE INVENTION

The liner of this invention for lining the interior of the bearing member of threadedly engaged bearing and shaft members ordinarily comprises at least three mating arcuate segments. Each segment has terminal edge surfaces which interface with terminal edge surfaces of two other segments. The interfacing surfaces at the terminal edges of at least one of the segments are substantially perpendicular to a common plane.

A conforming liner is mounted in the interior walls of a nut member, or other cavity formed in a body, so that the exterior wall of the liner is adhered to the wall of the cavity. Such mounting is accomplished by first forming the liner into a plurality of segments including at least one arcuate segment formed by a pair of dividing cuts made perpendicular to a common plane. The interior wall of the nut member or other cavity, or the exterior wall of the liner segments, or both, are coated with a suitable adhesive. All of the segments, except the one formed by a pair of cuts perpendicular to a common plane, are then positioned on the cavity wall in matingly adjoining relationship leaving a gap having similarly perpendicular dividing cuts at opposite sides for receiving the remaining segment. These segments are positioned by an initial approximately axial insertion of each segment into the cavity with the exterior of the liner not in significant contact with the interior of the nut member, followed by an approximately radial movement to the cavity wall. Finally, the one remaining segment is positioned in the gap by inserting it too, approximately axially into the cavity, not in significant contact with the interior of the nut member, and then moving it approximately parallel to its end cuts into the gap and against the cavity wall.

The adhesive composition used for bonding the liner to the nut member provides improved heat transfer between these structures. The composition comprises an adhesive and heat conductor particles dispersed in the adhesive.

DESCRIPTION OF THE VIEWS

FIG. 4 is an end view of the nut member and the first segment of the nut liner positioned in the nut member;

FIG. 5 is an end view of the nut member showing the first and second segments inserted in the nut member;

FIG. 6 is an end view of the nut member illustrating the positioning of the third segment into the nut member;

FIG. 7 is a view in vertical section of the expandable mandrel structure used to clamp the liner against the interior of the nut member during the curing of the bonding agent.

Figure 1:
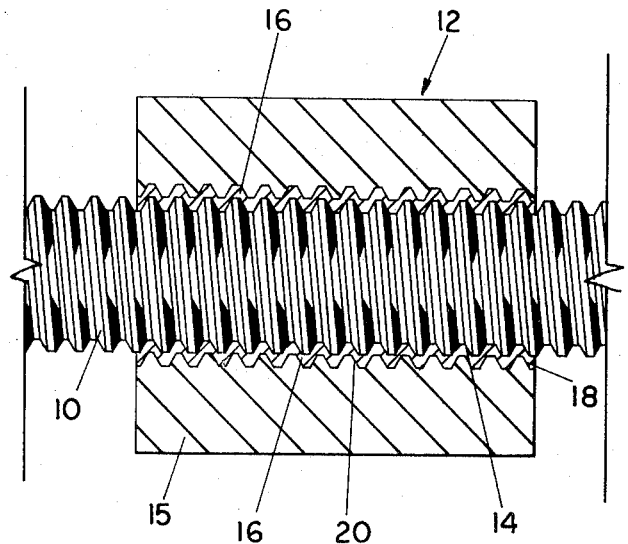
FIG. 1 is a view in vertical cross section of a nut, nut liner, and cooperating screw combination made according to the invention.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

Figure 2:
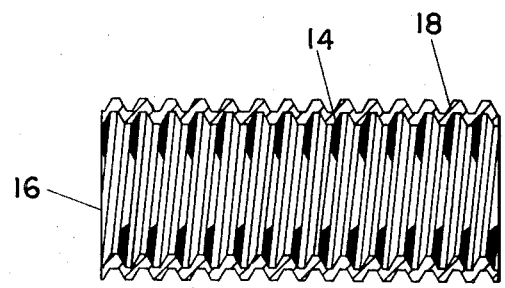
FIG. 2 is a view in vertical section of the nut liner shown in FIG. 1.

The basic working parts of an Acme thread, jackscrew-type actuator are illustrated in FIG. 1. The jackscrew 10 is a threaded shaft which normally extends considerably further than illustrated in FIG. 1. Threadedly engaging the screw 10 is a nut member 12. This nut member 12 is a bearing having internal threads 14 and comprises an outer shell 15 and a liner 16. The liner 16 is provided with external threads 18 which threadedly engage internal threads 20 of the outer shell 15. The threads 14 are provided on the interior of the liner 16, paralleling the outer threads 18 and threadedly engaging the threads of the screw 10. Obviously, rotation of either the nut member 12 or the screw member 10 relative to the other will cause one member to move axially relative to the other. A vertical section of the liner 16 is illustrated in FIG. 2 showing its interior threads 14 and its paralleling exterior threads 18. For clarity of illustration, the liner 16 is shown disproportionately larger than it actually is in some applications. For example a liner having a thickness of 0.030 inches has been used.

Various materials are available from which the liner 16 can be made. For example, the liner 16 might be made of "Bearium" bronze alloy. This alloy comprises 70 percent copper, 22 percent lead, and 8 percent tin. Another suitable material is Teflon or polytetrafluoroethylene impregnated with random length dense glass fibers and 4 percent to 5 percent molybdenum disulfide. This material provides a self-lubricating function. There are, of course, other metals, resins and lubricant impregnated fabrics suitable for fabricating the liner 16.

Figure 3:
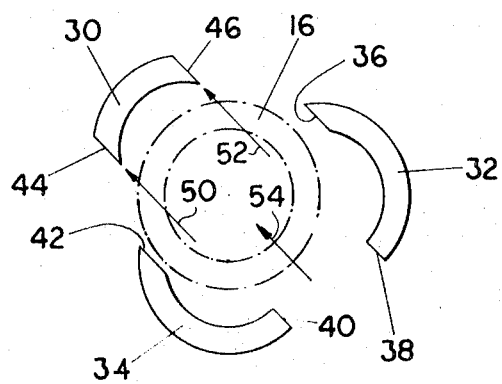
FIG. 3 is an exploded end view illustrating the nut liner divided into three segments and showing in phantom the undivided nut liner and the lines of cutting therethrough.

In FIG. 3, an end view of the liner 16 is shown in phantom. The liner 16 comprises three segments 30, 32 and 34 shown exploded in FIG. 3. More than three segments could equivalently be used so long as the segments matingly join in forming a complete liner. Each of the three mating, arcuate segments, 30, 32 and 34 have terminal edge surfaces which, when the liner is assembled, interface with terminal edge surfaces to two other segments. The segment 32 has terminal edge surfaces 36 and 38. The segment 34 has terminal edge surfaces 40 and 42. At least one segment, in this case the segment 30, has interfacing surfaces 44 and 46 at its terminal edges which are substantially perpendicular to a common plane. The preferred interfacing surfaces 44 and 46 are planar, parallel to each other, parallel to the central axis of the liner, and equidistant from the central axis of the liner. More than one such segment could be provided having edges substantially perpendicular to a common plane. Also, such a segment could be divided into subsegments.

The segments forming the liner 16 could of course be separately formed. In such case, the divisions between them may still be referred to as cuts. However, it is preferable to form the liner 16 as a single unit and then actually cut the liner into segments along the longitudinal cuts 50, 52 and 54 shown as arrows in FIG. 3. The cuts 50 and 52 are the ones made perpendicular to a common plane to form the segment 30.

Figure 8:
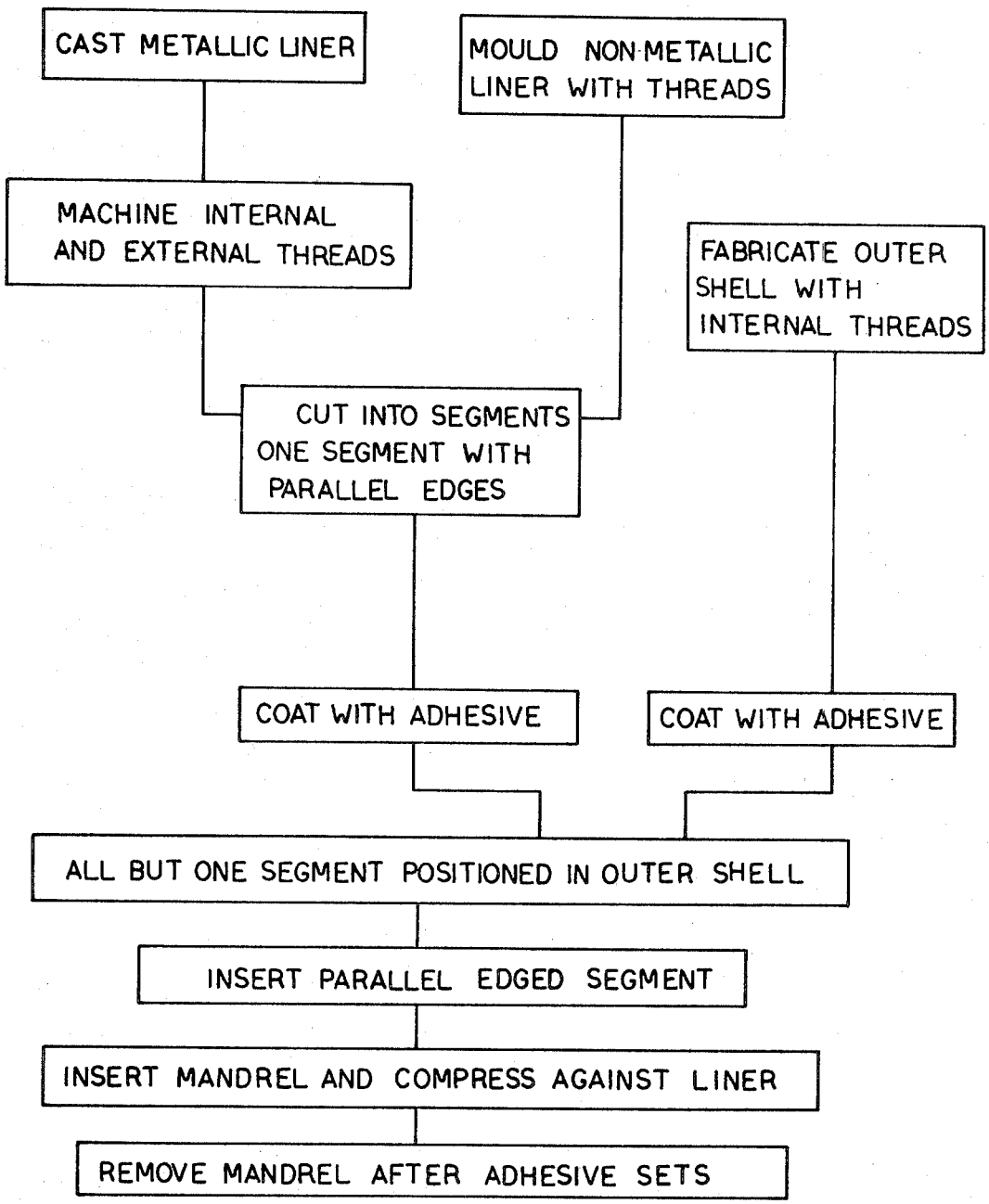
FIG. 8 is a diagrammatic view illustrating the method of fabricating and mounting a conforming liner in the interior of a nut member.

FIGS. 4, 5, and 6 illustrate the method for mounting the conforming liner 16 in the outer shell 15. By this method the exterior wall of the liner 16 is bonded to the interior wall of the outer shell 15 to fabricate a nut member for a screw-type actuator. FIG. 8 illustrates diagrammatically the entire method for fabricating and mounting the liner.

The liner may first be manufactured, for example, by casting a metal liner or moulding a resin liner. Preferably mating threads are formed on the exterior of the liner and on the interior of the outer shell, and similar threads are formed on the interior of the liner. These threads may be cast or molded during the casting or molding of the liner or they may be machined after casting. The liner is then formed into a plurality of segments by cutting the unitary liner into the desired segments. At least one (30) of the arcuate segments is formed by a pair of dividing cuts 50 and 52 made perpendicularly to a common plane.

The exterior of the liner and the interior of the shell are to be bonded together. At least one of these coadhering surfaces, and preferably both, are coated with a suitable bonding agent and cured as necessary. All of the segments except the one segment 30 are now to be positioned on the wall inside the shell in matingly adjoining relationship leaving a gap for receipt of the one segment 30. These first segments are positioned by an initial approximately axial insertion of each segment into the cavity followed by an approximately radial movement to the cavity wall. In FIG. 4 the segment 34 is axially inserted to the position shown in phantom and then radially moved against the inner wall of the shell 15. In FIG. 5, the segment 32 is initially approximately axially inserted into the shell 15 to the position shown in phantom and then moved approximately radially against the inner wall of the outer shell 15. The first segments 32 and 34, matingly adjoin at the cut 54. As illustrated in FIG. 6 the last segment 30, having the parallel cuts at its terminal edges, is now positioned in the remaining gap. It too is initially inserted approximately axially into the shell 15 to the position shown in phantom and then moved approximately parallel to the cuts 52 and 54 into the gap and against the inner wall of the shell 15. The terminal edge surfaces of the last segment 30 to be inserted in the shell are perpendicular to a common plane and therefore are parallel to the direction of movement of the last segment against the inner wall of the shell 15. All the segments may therefore be inserted and snapped into position without wiping or otherwise removing the bonding agent from the threads during the assembly procedure. Furthermore this structure leaves no substantial discontinuities along the inner surface of the liner. Prior art liners which are formed in segments having radial cuts dividing them have, of course, been known. However, radial cuts do not permit positioning of a liner in the outer shell, without removal of bonding agent, while maintaining a smooth, continuous inner surface.

After the liner 16 is assembled in the outer shell 15, an expandable mandrel is inserted into the assembled liner and expanded to clamp the liner against the inner walls of the shell. The mandrel is illustrated in FIG. 7. A preferred mandrel has an expandable core 60 of silicone rubber or similar material. End caps 62 and 64 are positioned against the opposite ends of the core 60. Force is applied on the end caps 62 and 64 urging them toward each other, therefore expanding the core radially outwardly and transmitting a pressure through the semifluid rubber core against the interior of the liner. This pressure is continued until the bonding agent is properly set. The core is then removed by initially removing the end caps and then withdrawing the core 60.

Although various types of bonding agents are available for bonding the liner to the interior of the shell it is preferable to use an epoxy type of adhesive which has heat conductor particles dispersed in the adhesive. These particles may be any of the well-known conductor materials and in particular may be metals such as aluminum and copper. Of course, the term "conductor" like the term "insulator" is a relative term. The term "conductor" is used herein to indicate a material which has heat conducting properties substantially better than the heat conducting properties of the bonding agent. The heat conductor particles are suitable for use if they have a heat conductivity substantially higher than the conductivity of the bonding agent.

It should be understood that the cuts at the terminal edges of the very important one segment need not necessarily be planar or be orientated along parallel planes. It is only necessary that the terminal edge surfaces of this one segment everywhere be parallel to the direction of movement of the segment into the remaining gap. Consider, for example, a hypothetical, thin, narrow knife which is always held parallel to the assumed direction of movement of the last segment into the gap. This knife could be used to cut the important one segment by always holding it parallel to the assumed direction of movement but otherwise passing it in a wavy or other arbitrary manner approximately longitudinally through the liner. Two such cuts, not necessarily similar, would be made to define the one last segment. Three segments are needed for rigid liner materials because no single segment can have 180° of arc. If one segment has 180° of arc it would require deforming to permit insertion into the outer shell without significantly contacting the outer shell and thereby wiping off some bonding agent. If some deflection is permissible, the liner can be cut into two segments, one of which would have terminal edges perpendicular to a common plane. The other would then require inward deflection, as by squeezing across the gap to permit insertion into the outer member.

It is to be understood that while the detailed drawings and specific examples given describe preferred embodiments of the invention they are for the purpose of illustration only, that the apparatus of the invention is not limited to the precise details and conditions disclosed, and that various changes may be made therein without departing from the spirit of the invention which are defined by the following claims. I claim:

1. A liner for lining the interior of a bearing member of engaged bearing and shaft members, the liner comprising:
   at least three mating, arcuate segments, each segment having terminal edge surfaces interfacing with terminal edge surfaces of two other segments, the interfacing surfaces at the terminal edges of at least one segment being substantially perpendicular to a common plane.
2. A liner according to claim 1, wherein
   the interfacing surfaces at the terminal edges of said one section are planar and parallel to each other.
3. A liner according to claim 2, wherein
   the interfacing surfaces at the terminal edges of said one section are parallel to the central axis of the liner.
4. A liner according to claim 3, wherein
   the planes of the interfacing surfaces at the terminal edges of said one section are equidistant from the central axis of the liner.
5. A liner according to claim 4, wherein
   the liner has three segments divided by three parallel, substantially equally spaced, interfacing pairs of edge surfaces.
6. A screw-type actuator having a bearing member, a shaft member and a liner according to claim 1, for moving a first body relative to a second body, wherein:
   1. said shaft member is an externally threaded screw member linked to the first body; and
   2. said bearing member is a nut member threadedly engaged to the screw member and linked to the second body, the nut member comprising:
      a. an outer shell; and
      b. said liner seated in said outer shell, having interior threads cooperating with the threads of the screw member and attached by a suitable bonding agent to the interior of the outer shell;
   wherein rotation of one member relative to the other moves one of said bodies relative to the other.
7. An actuator according to claim 6, wherein
   the interior of the outer shell and the exterior of the liner have mating threaded surfaces which substantially parallel the internal threads of the liner.
8. An actuator according to claim 6, wherein
   the bonding agent has heat conductor particles mixed therein.
9. An actuator according to claim 8, wherein
   the bonding agent comprises an epoxy adhesive having aluminum therein.
10. A method for fabricating and mounting a conforming liner in the interior walls of a curved-wall cavity formed in a body so that the exterior wall of the liner is adhered to the wall of the cavity, the method comprising the steps of:
    a. forming the liner into a plurality of segments including at least one arcuate segment formed by a pair of dividing cuts perpendicular to a common plane;
    b. coating at least one of the coadhering surfaces with a suitable adhesive;
    c. positioning all the segments except said one segment on the cavity wall in matingly adjoining relationship leaving a gap having said perpendicular cuts at opposite sides for receiving said one segment, said segments being positioned by an initial approximately axial insertion of each segment into the cavity followed by an approximately radial movement to the cavity wall; and
    d. positioning said one segment in the gap by initially inserting it approximately axially into the cavity and then moving it approximately parallel to said pair of cuts into the gap and against the cavity wall.
11. A method according to claim 10, wherein
    an expandable mandrel is inserted into the assembled liner and expanded to clamp the liner against the cavity walls.
12. A method according to claim 11, for inserting a liner in an outer shell to fabricate a nut member for a screw type actuator, wherein prior to cutting a liner into segments
    mating threads are formed on the interior of the liner and on the interior of the outer shell and similar threads are formed on the interior of the liner for threadedly engaging the screw of said actuator.
13. A liner according to claim 1 wherein said liner is bonded to the bearing member by an adhesive composition for bonding two surfaces and for providing improved heat transfer between the surfaces, the composition comprising:
    a. an adhesive; and
    b. heat conductor particles dispersed in said adhesive.
14. A composition according to claim 13 wherein
    said particles are metallic particles.
15. A composition according to claim 14 wherein
    the particles include aluminum.
16. A composition according to claim 14 wherein
    the particles include copper.

* * * * *